(12) United States Patent
Shinohara (10) Patent No.: US 9,082,350 B2
(45) Date of Patent: Jul. 14, 2015

(54) ELECTRONIC DEVICE, DISPLAY CONTROL METHOD, AND STORAGE MEDIUM STORING DISPLAY CONTROL PROGRAM

(75) Inventor: Kenji Shinohara, Yokohama (JP)

(73) Assignee: KYOCERA CORPORATION, Fushimi-Ku, Kyoto (JP)

( * ) Notice: Subject to any disclaimer, the term of this patent is extended or adjusted under 35 U.S.C. 154(b) by 62 days.

(21) Appl. No.: 13/403,480

(22) Filed: Feb. 23, 2012

(65) Prior Publication Data

US 2012/0218310 A1   Aug. 30, 2012

(30) Foreign Application Priority Data

Feb. 24, 2011   (JP) ................ 2011-039098

(51) Int. Cl.
| | |
|---|---|
| *G09G 5/00* | (2006.01) |
| *G09G 5/34* | (2006.01) |
| *G09G 5/14* | (2006.01) |
| *G06F 3/0485* | (2013.01) |
| *G06F 3/0488* | (2013.01) |

(52) U.S. Cl.
CPC .............. *G09G 5/343* (2013.01); *G06F 3/0485* (2013.01); *G06F 3/04883* (2013.01); *G09G 5/14* (2013.01); *G09G 5/34* (2013.01); *G09G 5/346* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,747,680 B1* | 6/2004 | Igarashi et al. ............... | 715/784 |
| 2006/0242595 A1* | 10/2006 | Kizumi ......................... | 715/786 |
| 2007/0226646 A1* | 9/2007 | Nagiyama et al. ............ | 715/784 |
| 2009/0219304 A1* | 9/2009 | Martin et al. .................. | 345/684 |
| 2010/0085384 A1* | 4/2010 | Kim et al. ...................... | 345/660 |
| 2010/0122205 A1* | 5/2010 | Jarrett et al. .................. | 715/784 |
| 2010/0235794 A1* | 9/2010 | Ording .......................... | 715/863 |
| 2011/0050629 A1* | 3/2011 | Homma et al. ............... | 345/174 |
| 2011/0202847 A1* | 8/2011 | Dimitrov ...................... | 715/738 |
| 2012/0064946 A1* | 3/2012 | Voetberg et al. ............. | 455/566 |
| 2012/0139935 A1 | 6/2012 | Miyasaka et al. | |

FOREIGN PATENT DOCUMENTS

| | | |
|---|---|---|
| JP | 2010152628 A | 7/2010 |
| WO | 2010146684 A1 | 12/2010 |

OTHER PUBLICATIONS

Office Action mailed Sep. 2, 2014, corresponding to Japanese patent application No. 2011-039098, for which an explanation of relevance is attached.

* cited by examiner

*Primary Examiner* — James A Thompson
*Assistant Examiner* — Xilin Guo
(74) *Attorney, Agent, or Firm* — Lowe Hauptman & Ham, LLP (57) ABSTRACT

According to an aspect, an electronic device includes a display unit, and a control unit. The display unit displays information. The control unit determines a scrolling speed of the information in accordance with a speed of an operation, and changes a display size of the information to be scrolled on the display unit in accordance with the scrolling speed.

8 Claims, 6 Drawing Sheets

ELECTRONIC DEVICE, DISPLAY CONTROL METHOD, AND STORAGE MEDIUM STORING DISPLAY CONTROL PROGRAM

CROSS-REFERENCE TO RELATED APPLICATIONS

This application claims priority from Japanese Application No. 2011-039098, filed on Feb. 24, 2011, the content of which is incorporated by reference herein in its entirety.

BACKGROUND

1. Technical Field

The present disclosure relates to an electronic device, a display control method, and a storage medium storing therein a display control program.

2. Description of the Related Art

Nowadays, a variety of electronic devices include a display unit formed of a liquid crystal display device or the like to display various information thereon. It is important to improve the visibility of information displayed on the display unit in order to improve the usability of such an electronic device including a display unit. Hence, proposed in Japanese Patent Application Laid-Open No. 2010-152628, for example, is a mobile electronic device that magnifies a part of characters for display in order to improve visibility.

Instances where the visibility of information displayed on the display unit is reduced include one where information displayed on the display unit is scrolled. Scrolling is necessary to display information beyond the display area of the display unit; however, it is highly likely to reduce visibility since information displayed on the display unit moves during scrolling. Japanese Patent Application Laid-Open No. 2010-152628 is not aimed to improve such a decline in visibility during scrolling.

For the foregoing reasons, there is a need for an electronic device, a display control method, and a display control program that improve the visibility of information displayed on the display unit during scrolling.

SUMMARY

According to an aspect, an electronic device includes a display unit, and a control unit. The display unit displays information. The control unit determines a scrolling speed of the information in accordance with a speed of an operation, and changes a display size of the information to be scrolled on the display unit in accordance with the scrolling speed.

According to another aspect, a display control method is executed by an electronic device including a display unit. The display control method includes: displaying information on display unit; detecting an operation for scrolling the information; determining a scrolling speed of the information in accordance with a speed of the operation; and changing a display size of the information to be scrolled on the display unit in accordance with the scrolling speed.

According to another aspect, a non-transitory storage medium stores therein a display control program. When executed by an electronic device which includes a display unit, the display control program causes the electronic device to execute: displaying information on display unit; detecting an operation for scrolling the information; determining a scrolling speed of the information in accordance with a speed of the operation; and changing a display size of the information to be scrolled on the display unit in accordance with the scrolling speed.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the electronic device, however, the present invention is not limited to mobile phones. Therefore, the present invention can be applied to any type of devices provided with a display unit, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
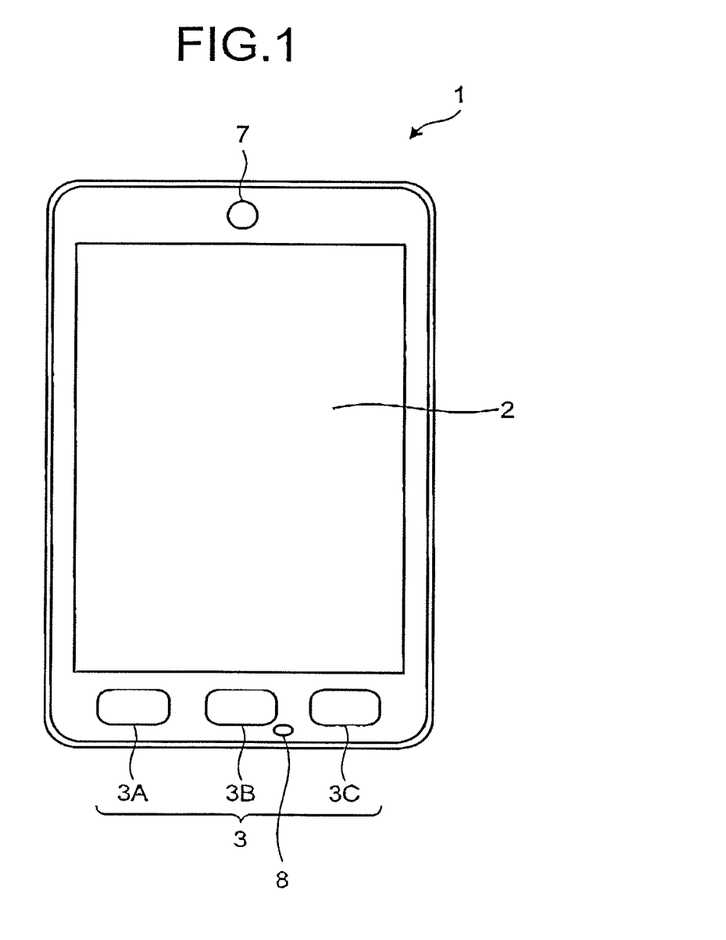
FIG. 1 is a front view of a mobile phone.

Firstly, a description will be given of the overall configuration of a mobile phone 1 being an embodiment of an electronic device with reference to FIG. 1. FIG. 1 is a front view of the mobile phone 1. The mobile phone 1 includes a substantially hexahedral housing having two surfaces larger in area than the other surfaces. A touchscreen 2, an input unit 3, a speaker 7 and a microphone 8 are provided on the surface of the housing.

The touchscreen 2 is disposed on one of the surfaces having the largest area, and displays characters, graphics, images and the like, and detects various operations (gestures) performed on the touchscreen 2 using a finger, stylus, a pen and the like (in the description herein below, for the sake of simplicity, it is assumed that the user touches the touch panel 2 and the touch sensor 4 with his/her fingers). The detection method of the touch panel 2 may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. The input unit 3 includes a plurality of buttons to which predetermined functions are assigned, such as a button 3A, a button 3B, and a button 3C. The speaker 7 outputs the voice of a person on the other end of line, music and sound effects, which are reproduced by various programs, and the like. The microphone 8 obtains voice during call and at the time of acceptance of operations by voice.

Figure 2:
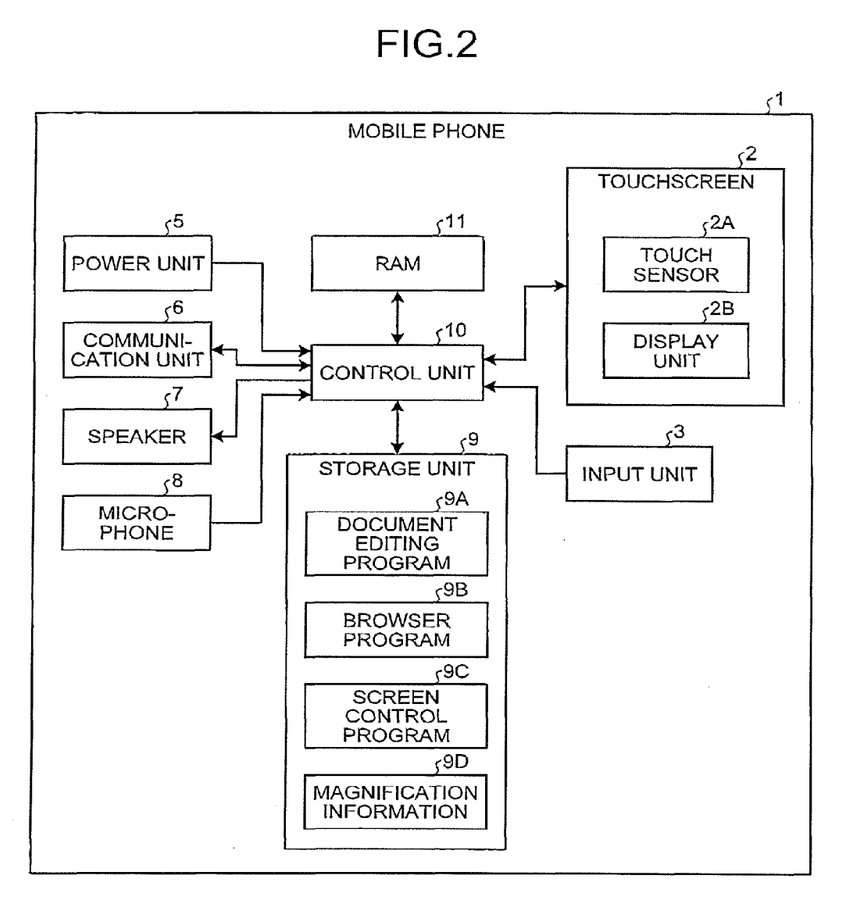
FIG. 2 is a block diagram of the mobile phone.

Next, a description will be given of the functional configuration of the mobile phone 1 with reference to FIG. 2. FIG. 2 is a block diagram of the mobile phone 1. As illustrated in FIG. 2, the mobile phone 1 includes the touchscreen 2, the input unit 3, a power unit 5, a communication unit 6, the speaker 7, the microphone 8, a storage unit 9, a control unit 10, and a random access memory (RAM) 11.

The touch panel 2 includes a display unit 2B and a touch sensor 2A that is arranged on the display unit 2B in a superimposed manner. The touch sensor 2A detects various operations performed on the touchscreen 2 using the finger as well as positions where the respective operations are performed on the touchscreen 2 to notify the control unit 10 of the detected results. The operations detected by the touch sensor 2A include a tapping operation and a swiping operation. The display unit 2B is configured of a liquid crystal display (LCD), an organic electro-luminescence display (OELD), or the like, and displays characters, graphics and the like.

The input unit 3 accepts the operation of a user through a physical button or the like, and transmits a signal corresponding to the accepted operation to the control unit 10. The power unit 5 supplies power obtained from a rechargeable battery or an external power source to the functional units of the mobile phone 1 including the control unit 10. The communication unit 6 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. The speaker 7 outputs an audio signal transmitted from the control unit 10 as sound. The microphone 8 converts the voice of a user and the like into an audio signal to transmit the audio signal to the control unit 10.

The storage unit 9 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 10. The storage unit 9 stores programs and data, which are used for processing by the control unit 10. The programs stored in the storage unit 9 include a document editing program 9A, a browser program 9B, and a screen control program 9C. The data stored in the storage unit 9 include magnification information 9D. The storage unit 9 also stores an operating system program that realizes the basic functions of the mobile phone 1, and other programs and data such as address book data. The storage unit 9 may be configured to be a combination of a portable storage medium such as a memory card and a reader of a storage medium.

The document editing program 9A provides the functions of realizing the editing and browsing of document data such as word processing data and spreadsheet data. The browser program 9B provides the function of realizing the browsing of web pages. The screen control program 9C causes characters, graphics and the like to be displayed on the touchscreen 2 in cooperation with functions provided by other programs. The screen control program 9C also provides the function of making it easy to visually confirm information displayed on the touchscreen 2 during scrolling as will be described below. The magnification information 9D maintains the setting for how much elements displayed on the screen are magnified during scrolling.

The control unit 10 is a processing unit such as a central processing unit (CPU). The control unit 10 integrally controls the operations of the mobile phone 1 to realize various functions. Specifically, the control unit 10 refers to data stored in the storage unit 9 and data loaded to the RAM 11 as necessary to execute instructions included in the programs stored in the storage unit 9, and accordingly controls the display unit 2B, the communication unit 6, and the like to realize the various functions. The programs executed and data referred to by the control unit 10 may be downloaded from a server apparatus through wireless communication by the communication unit 6.

The control unit 10 executes, for example, the document editing program 9A to realize the functions of editing and browsing electronic documents. The control unit 10 executes the screen control program 9C to realize the function of displaying screens and the like used by the various functions on the touchscreen 2. The control unit 10 can execute a plurality of programs in parallel by a multitask function provided by the operating system program.

The RAM 11 is used as a storage area where the instructions of a program executed by the control unit 10, data referred to by the control unit 10, a processing result of the control unit 10, and the like are temporarily stored.

A description will be given of control executed by the control unit 10 when the operation of scrolling a screen displayed on the display unit 2B is detected by the touch sensor 2A. The operation of scrolling a screen includes flicking operation and dragging operation performed to a direction that the screen can slide. The flicking operation is the operation of rapidly moving the finger in contact with the touch sensor 2A to one direction so as to flip something. The dragging operation is the operation of moving the finger while maintaining contact between the finger and the touch sensor 2A.

A part that is not displayed on the display unit 2B is displayed by scrolling; however, if a large part is not displayed on the display unit 2B, scrolling the screen slowly takes time to display a part desired to be displayed. On the other hand, if the screen is scrolled at high speed, it becomes difficult to visually confirm what is displayed on the display unit 2B and find a part desired to be displayed.

Hence, the control unit 10 magnifies specific elements in the information displayed on the display unit 2B in accordance with the scrolling speed. The specific elements are elements suitable for a user to understand the content displayed on the display unit 2B and identify which part of the whole is being displayed on the display unit 2B. In this manner, the display of magnified specific elements makes it easy for a user to visually recognize what is displayed on the display unit 2B even if the screen is scrolled at high speed.

Figure 3:
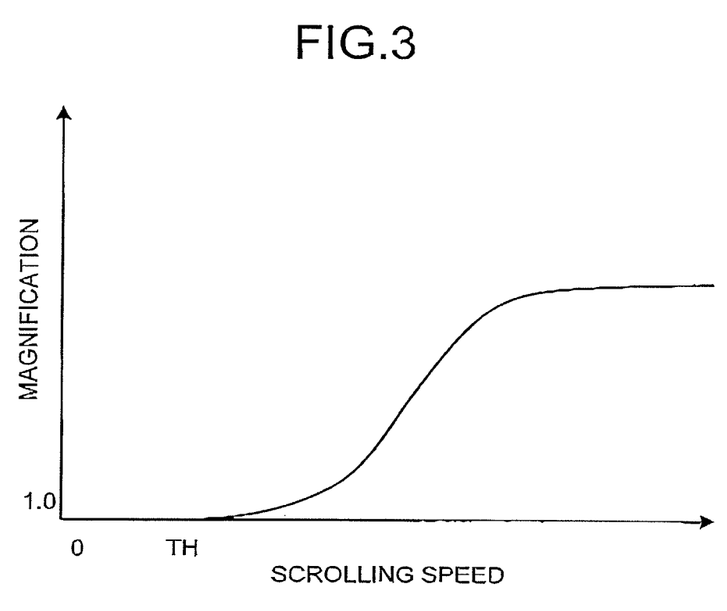
FIG. 3 is a diagram illustrating an example of magnification information.

The magnification of the specific elements is decided based on the magnification information 9D. FIG. 3 is a diagram illustrating an example of the magnification information 9D. As illustrated in FIG. 3, the magnification of the specific elements is set to 1.0 if the scrolling speed is less than a threshold value TH. In other words, if the scrolling speed is a relatively slow speed less than the threshold value TH, the specific elements are not magnified. If the scrolling speed is a relatively slow speed, it is not difficult to visually recognize the information displayed on the display unit 2B; accordingly, it is preferable that the layout of the information displayed on the display unit 2B should be maintained without magnifying the specific elements in this manner. The mobile phone 1 may be configured such that the user can arbitrarily reset the threshold value TH.

The magnification of the specific elements gradually increases when the scrolling speed exceeds the threshold value TH. Additionally, the magnification of the specific elements does not increase beyond the maximum value if the scrolling speed reaches a certain speed or greater. If the magnification is too high, the entire specific element cannot be displayed on the display unit 2B, and instead the visibility is reduced. The mobile phone 1 may be configured such that the user can arbitrarily reset the degree of a gradient to increase magnification and the maximum value of magnification.

If the specific elements are magnified, the layout of the other parts may be maintained as they are. In this case, the magnified elements may overlap the other parts. Alternatively, if the specific elements are magnified, the other parts may be reduced. In this case, the other parts may be reduced to smaller sizes as the scrolling speed becomes higher. The reduction of the other parts makes it possible to inhibit the distance between the starting and end points of the scrolling from becoming longer with the magnification of the specific elements.

Figure 4:
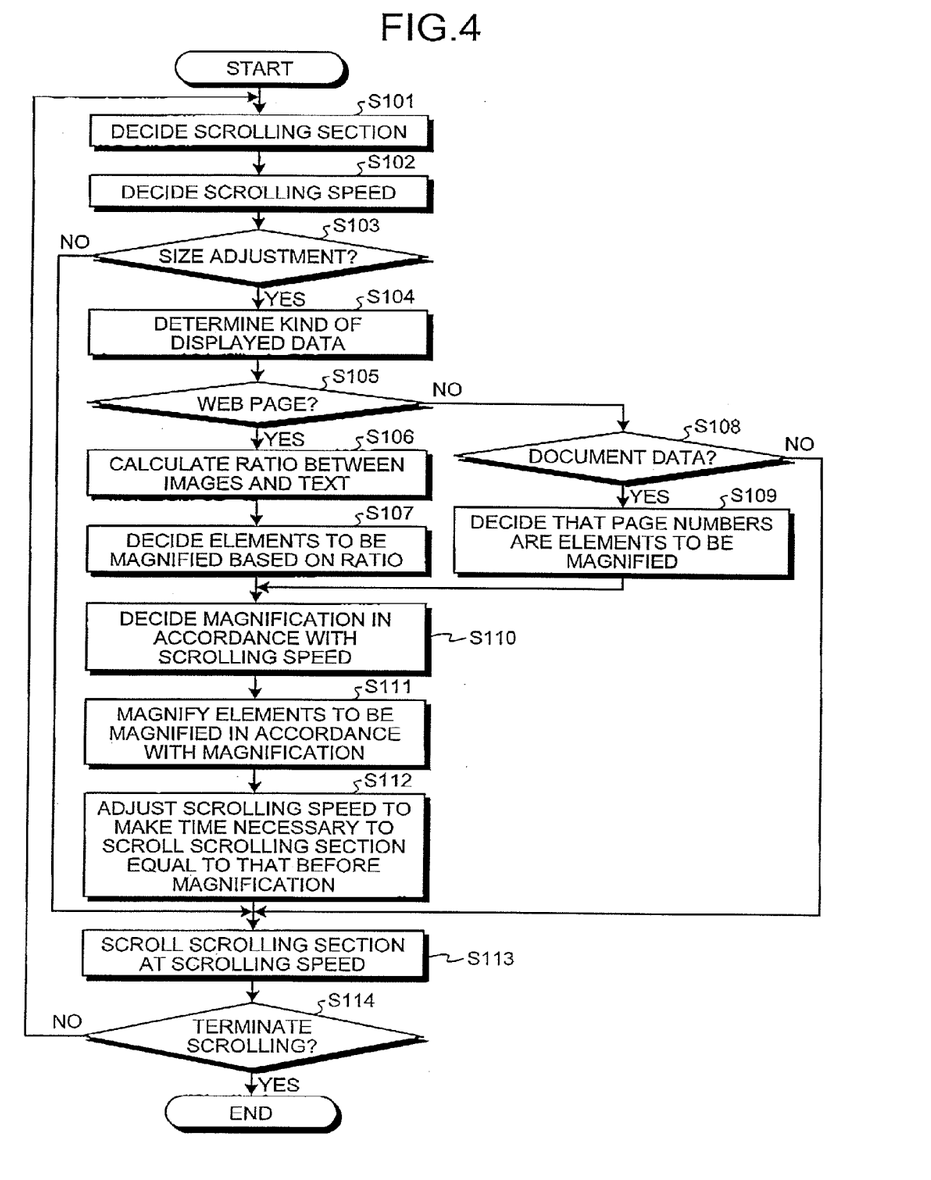
FIG. 4 is a flowchart illustrating the processing procedure of control executed by a control unit upon scrolling.

Next, a description will be given of the processing procedure of control executed by the control unit 10 upon scrolling with reference to FIG. 4. FIG. 4 is a flowchart illustrating the processing procedure of control executed by the control unit 10 upon scrolling. The control illustrated in FIG. 4 is executed based on the function provided by the screen control program 9C whenever the operation of scrolling the screen is newly detected.

As illustrated in FIG. 4, the control unit 10 decides a scrolling section at Step S101, and decides the scrolling speed in the scrolling section at Step S102. The scrolling section is a section until the next target for scrolling the screen. The scrolling section and the scrolling speed are decided based on the detected operation speed and the like.

If the user performs the flicking operation to scroll the screen, the control unit 10 controls the screen to keep scrolling under its own inertia in accordance with a flicking operation speed or acceleration even after the flicking operation is complete. In other words, if the flicking operation for scrolling the screen is detected, the control unit 10 starts scrolling at a speed in accordance with the flicking operation speed or acceleration, and then gradually decreases the scrolling speed. Accordingly, if the flicking operation for scrolling the screen is detected, the control unit 10 decides the scrolling section and the scrolling speed based on the flicking operation speed or acceleration and an elapsed time since the detection of the flicking operation.

On the other hand, if the user performs the dragging operation to scroll the screen, the control unit 10 controls the screen to scroll in the wake of the dragging operation. Accordingly, if the dragging operation for scrolling the screen is detected, the control unit 10 decides the scrolling section and the scrolling speed based on the latest dragging operation speed or acceleration and a moving distance.

Subsequently, the control unit 10 determines whether display elements have been set to be adjusted for size during scrolling at Step S103. In the present explanation, it is assumed that the user can arbitrarily set whether to adjust the sizes of the display elements during scrolling. If the size adjustment has not been set to be made (Step S103, No), the control unit 10 scrolls the scrolling section at the scrolling speed without magnifying any elements, at Step S113. The control unit 10 then determines whether to terminate the scrolling at Step S114.

If the operation of scrolling the screen is the flicking operation, it is determined to terminate the scrolling when a time in accordance with the flicking operation speed or acceleration elapses since the flicking operation is detected. If the operation of scrolling the screen is the dragging operation, it is determined to terminate the scrolling when the dragging operation is no longer detected. If it is determined to terminate the scrolling (Step S114, Yes), the control unit 10 terminates the processing procedure illustrated in FIG. 4. If it is determined not to terminate the scrolling (Step S114, No), the control unit 10 reexecutes the processing from Step S101.

If the display elements have been set to be adjusted for size during scrolling (Step S103, Yes), the control unit 10 determines the kind of data displayed on the display unit 2B at Step 104. If the data displayed on the display unit 2B is a web page (Step S105, Yes), the control unit 10 calculates the ratio between the images and text of the displayed web page at Step S106. The ratio between the images and text is calculated based on a total display area of the images and a total display area of the text, the total display areas being obtained by analyzing an HTML file by the function provided by the browser program 9B, for example. Preferably, advertisements included in the web page should be ignored when the ratio between the images and text of the web page is calculated.

Subsequently, the control unit 10 decides elements to be magnified based on the calculated ratio at Step S107. For example, if the ratio of the images is higher than a predetermined value, there is a high possibility that the web page that is being displayed has been obtained mainly to browse the images. Therefore, the images may be decided as elements to be magnified. On the other hand, if the ratio of the images is lower than the predetermined value, there is a high possibility that the web page that is being displayed has been obtained mainly to browse the text. Therefore, the text may be decided as an element to be magnified. If the text is decided as an element to be magnified, a part of the text such as a part surrounded by a tag indicating a heading such as <H1>, a part where the color, size or style of a font is different from that of the other most part, and a part where a link is embedded may be decided as an element to be magnified. The mobile phone 1 may be configured such that the user can arbitrarily reset the predetermined value related to the ratio of the images and, which part of the text to magnify, and the like.

If the data displayed on the display unit 2B is not a web page but document data (for example, data used for a presentation) (Step S105, No, Step S108, Yes), the control unit 10 decides at Step S109 that page numbers are elements to be magnified. If the document data is being displayed on the display unit 2B, elements other than the page numbers may be decided as elements to be magnified. For example, texts in a predetermined scope from the start of a page or paragraph or character strings set as headings may be decided as elements to be magnified.

If the data displayed on the display unit 2B is neither a web page nor document data (Step S105, No, Step S108, No), the control unit 10 scrolls the scrolling section at the scrolling speed without magnifying any elements, at Step S113. The control unit 10 then determines whether to terminate the scrolling at Step S114. If it is determined to terminate the scrolling (Step S114, Yes), the control unit 10 terminates the processing procedure illustrated in FIG. 4. If it is determined not to terminate the scrolling (Step S114, No), the control unit 10 reexecutes the processing from Step S101.

If deciding elements to be magnified in Step S107 or S109, the control unit 10 refers to the magnification information 9D to decide the magnification in accordance with the scrolling speed, at Step S110. At Step S111, the control unit 10 then magnifies the elements that have been decided to be magnified in accordance with the magnification. Elements to be magnified are limited to elements in the scrolling section. The magnification of the elements may be realized by calling a program such as the browser program 9B corresponding to the displayed data or a function provided by a program such as the browser program 9B, for example.

At Step S112, the control unit 10 then adjusts the scrolling speed such that the time necessary to scroll the scrolling section is made equal to the time required if elements are not magnified. For example, if the magnification of the text extends the distance between the starting and end points of the scrolling section, the control unit 10 increases the scrolling speed in accordance with the extended distance. In this manner, the adjustment of the scrolling speed makes it possible to inhibit the time necessary for the user to scroll a screen until a desired part from becoming longer and inhibit the user from feeling a sense of discomfort during scrolling.

Control may be performed such that the length of the scrolling section is made equal to that before the magnification of the elements by reducing elements other than elements to be magnified or causing elements to be magnified to overlap the other parts instead of adjusting the speed. Even under such control, it is possible to make the time necessary to scroll the scrolling section from the starting to end points equal to the time required if elements are not magnified.

Subsequently, at Step S113, the control unit 10 scrolls the scrolling section including the magnified elements at the adjusted scrolling speed. The control unit 10 then determines whether to terminate the scrolling at Step S114. If it is determined to terminate the scrolling (Step S114, Yes), the control unit 10 terminates the processing procedure illustrated in FIG. 4. If it is determined not to terminate the scrolling (Step S114, No), the control unit 10 reexecutes the processing from Step S101.

Figure 5:
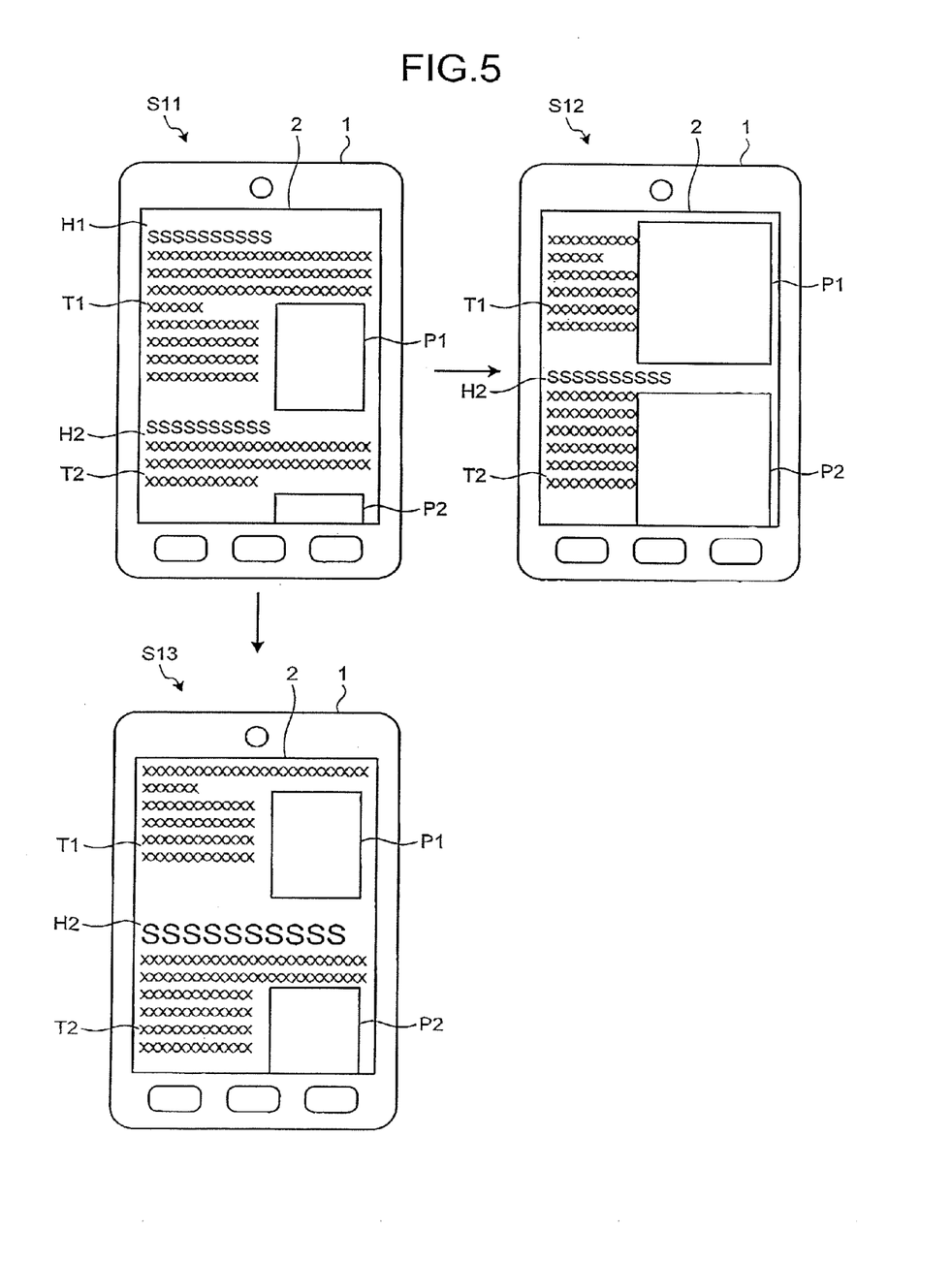
FIG. 5 is a diagram illustrating an example of screen control upon scrolling a web page.

Next, a description will be given of a specific example of screen control upon scrolling with reference to FIGS. 5 and 6. FIG. 5 is a diagram illustrating an example of screen control upon scrolling a web page. In Step S11 illustrated in FIG. 5, a web page is being displayed on the touchscreen 2. The web page displayed on the touchscreen 2 includes a heading H1, text T1 and an image P1 which correspond to the heading H1, a heading H2, text T2 and an image P2 which correspond to the heading H2, and the like.

If the scrolling operation by the user such as the flicking operation and the dragging operation is detected, and images are decided as elements to be magnified, images such as the images P1 and P2 are magnified for display during scrolling as illustrated in Step S12. Magnifying the images in this manner improves the visibility of the images and makes it easy for the user to recognize the content of a part that is currently being displayed on the touchscreen 2.

If the scrolling operation by the user is detected, and headings are decided as elements to be magnified, headings such as the heading H2 are magnified for display during scrolling as illustrated in Step S13. Magnifying the headings in this manner improves the visibility of the headings and makes it easy for the user to recognize the content of a part that is currently being displayed on the touchscreen 2.

Figure 6:
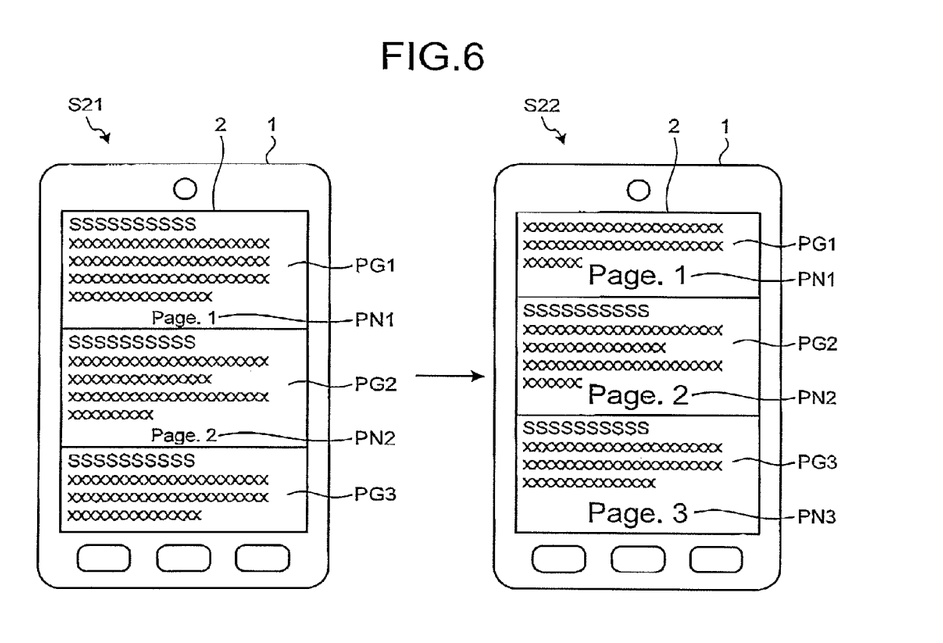
FIG. 6 is a diagram illustrating another example of screen control upon scrolling document data.

FIG. 6 is a diagram illustrating another example of screen control upon scrolling document data. In Step S21 illustrated in FIG. 6, document data is being displayed on the touchscreen 2. The document data displayed on the touchscreen 2 includes a plurality of pages such as a page PG1, a page PG2 and a page PG3. The page numbers such as a page number PN1, a page number PN2 and a page number PN3 are provided on every page upon displaying the document data.

If the scrolling operation by the user is detected, the page numbers such as the page number PN1 are magnified for display during scrolling as illustrated in Step S22. Magnifying the page numbers in this manner improves the visibility of the page numbers and makes it easy for the user to identify what page a part that is currently being displayed on the touchscreen 2 is on. The page numbers are being displayed even not during scrolling in the example illustrated in FIG. 6, but the page numbers may be displayed only during scrolling.

As described above, specific elements are magnified for display during scrolling in the embodiment, and therefore it is possible to improve the visibility of information during scrolling.

The aspect of the present invention described in the embodiment may be arbitrarily modified without departing from the gist of the present invention. For example, the screen is scrolled in accordance with an operation performed on the touchscreen 2 in the embodiment; however, the screen may be scrolled in accordance with an operation performed on a pointing device such as a cursor key on a keyboard and a mouse.

The description has been given in the embodiment, taking the web page and document data as examples of data where specific elements are magnified for display during scrolling; however, the data where specific elements are magnified for display during scrolling may be data other than the web page and document data. For example, if the scrolling operation is detected while the list of emails included in an incoming mailbox, is being displayed, the subjects or source addresses of the emails may be magnified for display. Alternatively, if the scrolling operation is detected while a map data is being displayed, place names superimposed on the map may be magnified and displayed.

Specific elements are magnified at the same magnification in the scrolling section in the embodiment; however, the magnification may be set to be larger as an element is located closer to a position where the scrolling operation is detected on the touchscreen 2. There is a high possibility that the user performs the scrolling operation while visually checking a position in contact with the finger. Therefore, such control makes it possible to improve the visibility of a part that the user is very likely viewing.

The screen control program 9C described in the embodiment may be divided into a plurality of modules or may be incorporated into another program.

The advantages are that one embodiment of the invention provides an electronic device, a display control method, and a display control program that improve the visibility of information displayed on the display unit during scrolling.

What is claimed is:

1. An electronic device, comprising:
a display unit configured to display information; and
a control unit configured to
determine a scrolling speed of the information in accordance with a speed of an operation, and
change a display size of a part of the information to be scrolled on the display unit in accordance with the scrolling speed, without changing a display size of at least another part of the information to be scrolled on the display unit,
wherein
the information includes document data and a page number, and
the control unit is configured to magnify a display size of the page number, without changing a display size of the document data to be scrolled on the display unit.

2. The electronic device according to claim 1, wherein the control unit is configured not to change the display size of the information when the scrolling speed is less than a threshold value.

3. The electronic device according to claim 1, wherein, among elements of the information to be scrolled on the display unit, the control unit is configured to reduce a size of an element other than the page number, in accordance with the scrolling speed.

4. The electronic device according to claim 1, wherein the operation is performed toward a touch sensor arranged on the display unit.

5. The electronic device according to claim 4, wherein the control unit is configured to change, while scrolling the information, display sizes of portions of the information such that a portion closer to a position where the operation is detected by the touch sensor is magnified more than another portion farther from the position where the operation is detected by the touch sensor.

6. The electronic device according to claim 4, wherein the operation is a flicking operation.

7. A display control method executed by an electronic device including a display unit, the display control method comprising:
  displaying information on the display unit;
  detecting an operation for scrolling the information;
  determining a scrolling speed of the information in accordance with a speed of the operation; and
  changing a display size of a part of the information scrolled on the display unit in accordance with the scrolling speed, without changing a display size of at least another part of the information scrolled on the display unit,
wherein
  the information includes document data and a page number, and
  said changing comprises magnifying a display size of the page number, without changing a display size of the document data scrolled on the display unit.

8. A non-transitory storage medium that stores a display control program causing, when executed by an electronic device which includes a display unit, the electronic device to execute:
  displaying information on the display unit;
  detecting an operation for scrolling the information;
  determining a scrolling speed of the information in accordance with a speed of the operation; and
  changing a display size of a part of the information scrolled on the display unit in accordance with the scrolling speed, without changing a display size of at least another part of the information scrolled on the display unit,
wherein
  the information includes document data and a page number, and
  said changing comprises magnifying a display size of the page number, without changing a display size of the document data scrolled on the display unit.

* * * * *